United States Patent [19]
Herring et al.

[11] Patent Number: 6,014,614
[45] Date of Patent: Jan. 11, 2000

[54] METHOD AND MECHANISM FOR PERFORMING SPATIAL JOINS

[75] Inventors: John Herring, Ashburn, Va.; Nipun Agarwal, San Mateo, Calif.; Panagiotis Vretanos, Toronto, Canada

[73] Assignee: Oracle Corporation, Redwood Shores, Calif.

[21] Appl. No.: 09/086,499

[22] Filed: May 29, 1998

[51] Int. Cl.[7] ............................................. G06K 9/34
[52] U.S. Cl. ..................... 702/196; 382/176; 382/180; 382/203
[58] Field of Search ................................. 707/1, 2, 5, 10, 707/100, 101, 102, 103, 104, 105, 200, 201, 202, 203, 204; 702/189, 190, 196; 382/173, 180, 284, 113, 294, 176, 203

[56] References Cited

U.S. PATENT DOCUMENTS

| | | | |
|---|---|---|---|
| 5,542,073 | 7/1996 | Schiefer et al. | 395/600 |
| 5,652,882 | 7/1997 | Doktor | 395/617 |
| 5,751,852 | 5/1998 | Marimont et al. | 382/180 |
| 5,774,579 | 6/1998 | Wang et al. | 382/176 |
| 5,818,962 | 10/1998 | Mizukami | 382/180 |
| 5,884,320 | 3/1999 | Agrawal et al. | 707/104 |

OTHER PUBLICATIONS

H. Samet et al., "Recent Developments in Linear Quadtree-Based Geographic Information Systems", *Image and Vision Computing*, vol. 5, No. 3, Aug. 1987, pp. 187–197.

Michael A. Bauer, "Note: Set Operations on Linear Quadtrees", *Computer Vision, Graphics, and Image Processing*, vol. 29, No. 2, Feb. 1985, pp. 248–258.

Shu–Xiang Li et al., "The Quadcode and Its Arithmetic", *Communications of the ACM*, vol. 30, No. 7, Jul. 1987, pp. 621–626.

Marloes L. P. van Lierop, "Geometrical Transformations on Pictures Represented by Leafcodes", *Computer Vision, Graphics, and Image Processing*, vol. 33, No. 1, Jan. 1986, pp. 81–98.

S. K. Bhaskar, "Parallel Processing of Regions Represented by Linear Quadtrees", *Computer Vision, Graphics, and Image Processing*, vol. 42, No. 3, Jun. 1988, pp. 371–380.

Peng Gao et al., "Space Efficient Hierarchical Structures: Relatively Addressed Compact Quadtress for GISs", *Image and Vision Computing*, vol. 7, No. 3, Aug. 1989, pp. 173–177.

F.C. Holroyd et al., "Efficient Linear Quadtree Construction Algorithm", *Image and Vision Computing*, vol. 8, Aug. 1990, pp. 218–224.

Sotirios G. Ziavras et al., "Improved Algorithms for Translation of Pictures Represented by Leaf Codes", *Image and Vision Computing*, vol. 6, No. 1, Feb. 1998, pp. 13–20.

Shu–Xiang Li et al., "Adjacency Detection Using Quadcodes", *Communications of the ACM*, Jul. 1987, vol. 30, No. 7, pp. 627–631.

Hanan Samet, "Region Representation: Quadtrees from Boundary Codes", *Communications of the ACM*, vol. 23, No. 3, Mar. 1980, pp. 163–170.

Hanan Samet, "Note Region Representation: Quadtrees from Binary Arrays", *Computer Graphics and Image Processing*, vol. 13, No. 1, May 1980, pp. 88–93.

(List continued on next page.)

*Primary Examiner*—Patrick Assouad
*Assistant Examiner*—Hien Vo
*Attorney, Agent, or Firm*—McDermott, Will & Emery

[57] ABSTRACT

A method and mechanism for performing a spatial join between two sets of objects employs a two-pass primary filter. The objects are decomposed into variable-sized cells no larger than a predetermined cell size and stored in respective spatial indexes. The spatial indexes include a code for the variable-size cells of the object and a code for the fixed-size supercell of the variable-size cells. The first pass can be implemented as an equijoin filtering operation using the fixed-size cell codes corresponding to the predetermined cell size, and the second pass as a join operation using the variable-size cell codes at smaller cell sizes.

30 Claims, 11 Drawing Sheets

OTHER PUBLICATIONS

S.B.M. Bell et al., "Spatially Referenced Methods of Processing Raster and Vector Data", *Image and Vision Computing*, vol. 1, No. 4, Nov. 1983, pp. 211–220.

S. B. M. Bell et al., "Tesseral Amalgamators and Hierarchical Tessellations", *Image and Vision Computing*, vol. 9, No. 5, Oct. 1991, pp. 313–328.

Takashi Matsuyama et al., "A File Organization for Geographic Information Systems Based on Spatial Proximity", *Computer Vision, Graphics, and Image Processing*, vol. 26, No. 3, Jun. 1984, pp. 303–318.

Randal C. Nelson et al., "A Consistent Hierarchical Representation for Vector Data", *Compute Graphics*, vol. 20, No. 4, Aug. 1986, pp. 197–206.

D. J. Abel et al., A B(+) Tree Structure for Large Quadtrees, *Computer Vision, Graphics, and Image Processing*, vol. 37, No. 1, Jul. 1984, pp. 19–31.

D. J. Abel et al., "A Data Structure and Algorithm Based on a Linear Key for a Rectangle Retrieval Problem", *Computer Vision, Graphics, and Image Processing*, vol. 24, No. 1, Oct. 1983, pp. 1–13.

Fangju Wang, "Relational–Linear Quadtree Approach for Two–Dimensional Spatial Representation and Manipulation", *IEEE Transactions on Knowledge and Data Engineering*, vol. 3, No. 1, Mar. 1991, pp. 118–122.

Esen A. Ozkarahan et al., "Join Strategies Using Data Space Partitioning", *New Generation Computing*, vol. 6, No. 1, 1988, pp. 19–39.

Thomas Brinkhoff et al., "Approximations for a Multi–Step Processing of Spatial Joins", IGIS, 1994, pp. 25–34.

Ming–Ling Lo et al., "Spatial Joins Using Seeded Trees", SIGMOD Conferences 1994, pp. 209–220.

Ming–Ling Lo et al., "Generating Seeded Trees from Data Sets", SSD 1995, pp. 328–347.

Jignesh M. Patel et al., "Partition Based Spatial–Merge Join", SIGMOD Conference 1996, pp. 259–270.

Ming–Ling Lo et al., "Spatial Hash–Joins", SIGMOD Conference 1996, pp. 247–258.

Nick Koudas et al., "Size Separation Spatial Join", SIGMOD Conference 1997, pp. 324–335.

Xiaofang Zhou et al., "Data Partitioning for Parallel Spatial Join Processing", Advances in Spatial Databases (SSD) 1997, pp. 178–196.

(BACKGROUND)

| ROAD | CELL |
|---|---|
| 202 | 20 |
| 202 | 10 |
| 202 | 00 |
| 202 | 01 |
| 204 | 10 |
| 204 | 11 |
| 204 | 21 |
| 206 | 20 |
| 206 | 21 |
| 206 | 22 |
| 206 | 12 |
| 206 | 13 |
| 208 | 12 |
| 208 | 22 |
| 208 | 23 |

402

| PARK | CELL |
|---|---|
| 210 | 00 |
| 210 | 01 |
| 210 | 10 |
| 210 | 11 |
| 210 | 20 |
| 212 | 01 |
| 212 | 02 |
| 212 | 03 |
| 212 | 11 |
| 212 | 12 |
| 212 | 13 |
| 214 | 22 |
| 214 | 23 |
| 214 | 32 |
| 214 | 33 |

404

| ROAD | PARK |
|---|---|
| 202 | 210 |
| 202 | 212 |
| 204 | 210 |
| 204 | 212 |
| 206 | 210 |
| 206 | 212 |
| 206 | 214 |
| 208 | 212 |
| 208 | 214 |

| ROAD | CELL |
|------|------|
| 202 | 40 |
| 202 | 30 |
| 202 | 20 |
| 202 | 21 |
| 202 | 11 |
| 202 | 02 |
| 204 | 21 |
| 204 | 22 |
| 204 | 32 |
| 204 | 33 |
| 204 | 43 |
| 206 | 50 |
| 206 | 51 |
| 206 | 41 |
| 206 | 42 |
| 206 | 43 |
| 206 | 44 |
| 206 | 34 |
| 206 | 35 |
| 206 | 36 |
| 206 | 37 |
| 206 | 27 |
| 208 | 34 |
| 208 | 44 |
| 208 | 45 |
| 208 | 46 |
| 208 | 47 |

412

| PARK | CELL |
|------|------|
| 210 | 10 |
| 210 | 11 |
| 210 | 12 |
| 210 | 20 |
| 210 | 21 |
| 210 | 22 |
| 210 | 30 |
| 210 | 31 |
| 210 | 32 |
| 210 | 41 |
| 212 | 13 |
| 212 | 14 |
| 212 | 15 |
| 212 | 16 |
| 212 | 23 |
| 212 | 24 |
| 212 | 25 |
| 212 | 26 |
| 212 | 33 |
| 212 | 34 |
| 214 | 45 |
| 214 | 46 |
| 214 | 47 |
| 214 | 55 |
| 214 | 56 |
| 214 | 57 |
| 214 | 65 |
| 214 | 66 |
| 214 | 67 |
| 214 | 75 |
| 214 | 76 |
| 214 | 77 |

414

| ROAD | PARK |
|------|------|
| 202 | 210 |
| 204 | 210 |
| 204 | 212 |
| 206 | 210 |
| 206 | 212 |
| 208 | 212 |
| 208 | 214 |

Figure 8

800
| ROAD | FIX | CELL | MAX |
|------|-----|------|-----|
| 202 | 200 | 2000 | 20003 |
| 202 | 022 | 0222 | 02223 |
| 202 | 022 | 0223 | 02233 |
| 202 | 022 | 0221 | 02213 |
| 202 | 020 | 0203 | 02033 |
| 202 | 021 | 0212 | 02123 |
| 202 | 021 | 0210 | 02103 |
| 202 | 003 | 0032 | 00323 |
| 202 | 003 | 0033 | 00333 |
| 202 | 003 | 0031 | 00313 |
| 202 | 012 | 0120 | 01203 |
| 202 | 010 | 0102 | 01023 |
| 202 | 010 | 0100 | 01003 |
| 202 | 010 | 0101 | 01013 |
| ... | ... | ... | ... |

802
| PARK | FIX | CELL | MAX |
|------|-----|------|-----|
| 210 | 002 | 0021 | 00213 |
| 210 | 002 | 0023 | 00233 |
| 210 | 003 | 0030 | 00303 |
| 210 | 003 | 0031 | 00313 |
| 210 | 003 | 0032 | 00323 |
| 210 | 003 | 0033 | 00333 |
| 210 | 012 | 0120 | 01203 |
| 210 | 012 | 0122 | 01223 |
| 210 | 020 | 0201 | 02013 |
| 210 | 020 | 0203 | 02033 |
| 210 | 021 | 021 | 02133 |
| 210 | 030 | 0300 | 03003 |
| 210 | 030 | 0302 | 03023 |
| 210 | 030 | 0303 | 03033 |
| 210 | 022 | 0221 | 02213 |
| 210 | 023 | 0230 | 02303 |
| 210 | 023 | 0231 | 02313 |
| 210 | 023 | 0232 | 02323 |
| 210 | 023 | 0233 | 02333 |
| 210 | 032 | 0320 | 03203 |
| 210 | 032 | 0321 | 03213 |
| 210 | 032 | 0322 | 03223 |
| 210 | 201 | 2011 | 20113 |
| ... | ... | ... | ... |

804
| ROAD | PARK |
|------|------|
| 202 | 210 |
| 204 | 210 |
| 204 | 212 |
| 206 | 210 |
| 206 | 212 |
| 208 | 212 |
| 208 | 214 |

806
| ROAD | PARK |
|------|------|
| 202 | 210 |
| 204 | 210 |
| 208 | 214 |

METHOD AND MECHANISM FOR PERFORMING SPATIAL JOINS

FIELD OF THE INVENTION

The present invention relates to processing spatial data and more particularly to an efficient computation of a spatial join.

BACKGROUND OF THE INVENTION

Spatial data describes the shape and location of objects within a space. It is estimated that spatial data is associated with a large percentage of an organization's information. For example, organizations have spent billions of dollars over the years amassing spatial data in the form of street addresses, zip codes, maps, and satellite imagery. Based on the economic value of spatial data, there is a long-felt need for the efficient processing and storage of spatial data.

Typical spatial data systems, such as geographic information systems (GIS), represent the spatial characteristic of objects with geometric primitives. For example, the location of a mailbox, automated teller machine, fire hydrant, or oil well can be represented by a point. As another example, roads, railroad tracks, power lines, oil pipelines can be represented by one-dimensional primitives such as curves, lines, and line strings, and areas such as parks, lakes, political districts, and oil fields can be represented by two-dimensional primitives such as circles and polygons.

FIG. 2 depicts an exemplary space 200 illustrating a map of a geographic area consisting of roads and parks. In the exemplary space 200, there are four roads 202, 204, 206 and 208, represented by lines, and three parks 210, 212, and 214, represented by polygons. In space 200, roads and parks may intersect. More specifically, road 202 intersects park 210, which is also intersected by road 204. Road 206 does not intersect any park, and park 212 is not intersected by any road. Finally, road 208 is the only road that intersects park 214.

A spatial join is a type of spatial query that combines two sets of objects based on their relative locations, i.e., the geometric attributes of the objects must satisfy some spatial predicate. In particular, a spatial join answers a query about which spatial objects from one set interact according to a spatial predicate with spatial objects from another set. Examples of spatial predicates include such relationships as whether two objects touch, whether one object overlaps another, and whether one object is inside another. For example, determining which roads 202, 204, 206 and 208 intersect which parks 210, 212, and 214 in space 200 involves a spatial join. In this example, data is combined to form pairs of roads and park from a set of roads and a set of parks, respectively, based on a spatial predicate of overlapping by intersection. Another example is a query that requests how many fire hydrants are within five blocks of a school.

One conventional approach to calculating a spatial join is to perform a nested spatial operation such as a nested range query, which uses the first set of objects to drive a series of range queries on the second set of objects. A range query, such as a "locate fence" query and a window query, is a spatial operation that determines whether an object interacts with, e.g. overlaps, a query range such as the interior of a polygon. In the exemplary space 200, a nested range query to find the roads that intersect the park involves first performing range queries for the road 202 to determine which of the parks 210, 212, and 214 overlap road 202. In this example, park 210 succeeds, while parks 212 and 214 fail. This process is repeated for road 204 (successful only for park 210), then for road 206 (fails for all parks 210, 212, and 214), and finally for road 208, which is successful only for park 214.

A major drawback with the nested range query approach is a lack of scalability in computation time. Processing each object in the first set has some cost, and the aggregate cost for performing all the range queries is roughly proportional to the product of this cost and the number of objects in the first set. If the cost for performing range queries of one object in the first upon each object in the second set is approximately linear, then, the total running time is O(mn), where m is the number of objects in the first set and n is the number of objects in the second set. Accordingly, conventional systems typically employ ancillary data structures such as indexes to reduce each iteration down to an O(log n) running time, aggregating to a log-linear O(m log n) running time. However, even log-linear running times quickly become unacceptable for very large data sets.

Thus, one approach to reducing the computational expense of a spatial join is to use a computationally inexpensive preprocessing step for eliminating at least some of the answers that do not satisfy the spatial join query. Only those answers that pass this preprocessing step, called a "primary filter," are submitted to the more expensive range queries and other exact spatial operation in a phase called the "secondary filter." For example, road 202 is quite distant from and does not intersect park 214. Thus, one useful primary filter would exclude this combination of road 202 and park 214 as an answer to the exemplary spatial join. A primary filter therefore is an "inexact" spatial join. By "inexact," it is meant that the result of the primary filter may contain answers that do not satisfy the spatial predicate according to the exact method. However, a valid primary filter must produce all the correct answers to the spatial join query.

Since a primary filter need not be "exact," it is acceptable for a primary filter to use approximations to reduce the computational complexity and maintain computational scalability. The computational costs of a primary filter are typically reduced by storing information in ancillary data structures such as an index. Thus, a primary filter permits the fast selection of a small number of candidate answers to pass along to the exact, and computationally more expensive methods of the secondary filter. However, it is also desirable to improve the selectivity and running time of the primary filter, yet conventional primary filters tend to degrade in terms of storage space for the indexes and compute-time requirements when higher-resolution approximation techniques are employed.

SUMMARY OF THE INVENTION

There is a need for improving the scalability of a primary filter in terms of resolution and storage space, preferably while maintaining the compute-time scalability. There is also a need for reducing the storage costs of a primary filter, for example, by reducing the size of ancillary data structures, while not adversely affecting the selectivity of the primary filter.

These and other needs are met by the present invention, in which a two-pass primary filter is used in computing a spatial join between two sets of objects. The objects are decomposed into variable-sized cells, which allows many smaller cells to be coalesced into larger super-cells that maintain the resolution of the object in a spatial index while reducing the number of entries for the object. However, each variable-sized cell is no larger than a predetermined cell size. The first pass can be implemented as an equijoin filtering operation at the resolution of the predetermined cell size for speed, and the second pass as a join operation at smaller cell sizes for improved filtering selectivity.

One aspect of the invention is a computer-implemented method and computer-readable medium bearing instructions arranged for determining which of a set of first objects interacts within a space with which of a set of second objects according to a spatial predicate. The first objects and second objects are decomposed into one or more cells. Each cell defines a region in the space and has a size no larger than a predetermined cell size. Pairs of the first objects and the second objects, respectively, are filtered to produce candidate pairs of the first objects and the second objects by (a) determining those pairs of the first objects and the second objects, respectively, that share common cells at the predetermined cell size, and (b) determining those pairs of the first objects and the second objects, respectively, that share overlapping cells at smaller cell sizes. The candidate pairs that indicate which first objects interact with which second objects according to the spatial predicate are then tested.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 4(a) and 4(b) illustrate spatial indexes for the roads and parks of FIGS. 3(a) and 3(b) respectively as well as the results of performing a primary filtering step.

FIG. 8 illustrates a portion of a spatial index for spatial objects used in accordance with a hybrid approach as well as the results of performing a primary filtering step according to an embodiment of the present invention.

DESCRIPTION OF THE PREFERRED EMBODIMENT

A method and apparatus for spatial join processing are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
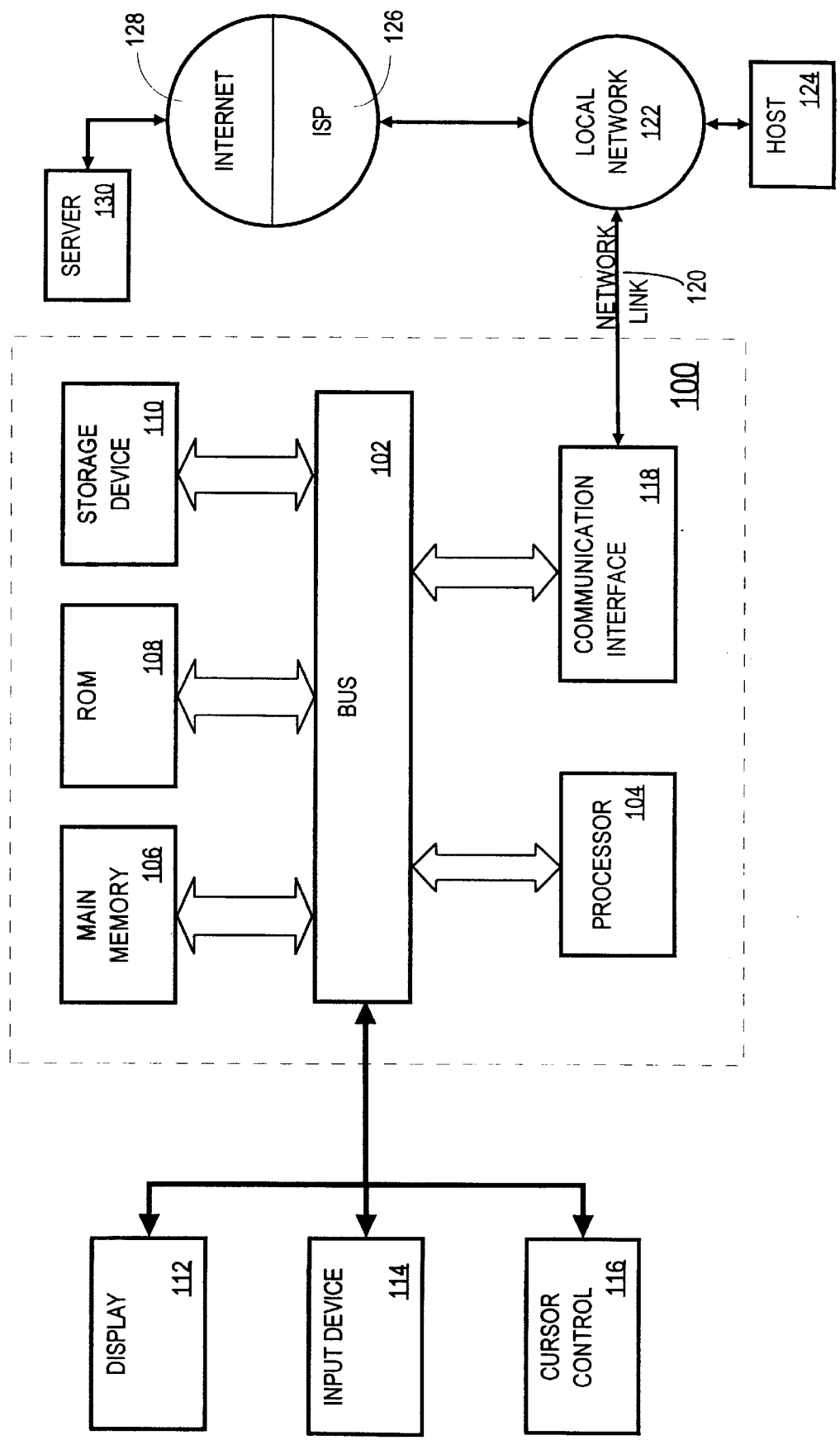
FIG. 1 depicts a computer system that can be used to implement the present invention.
Figure 2:
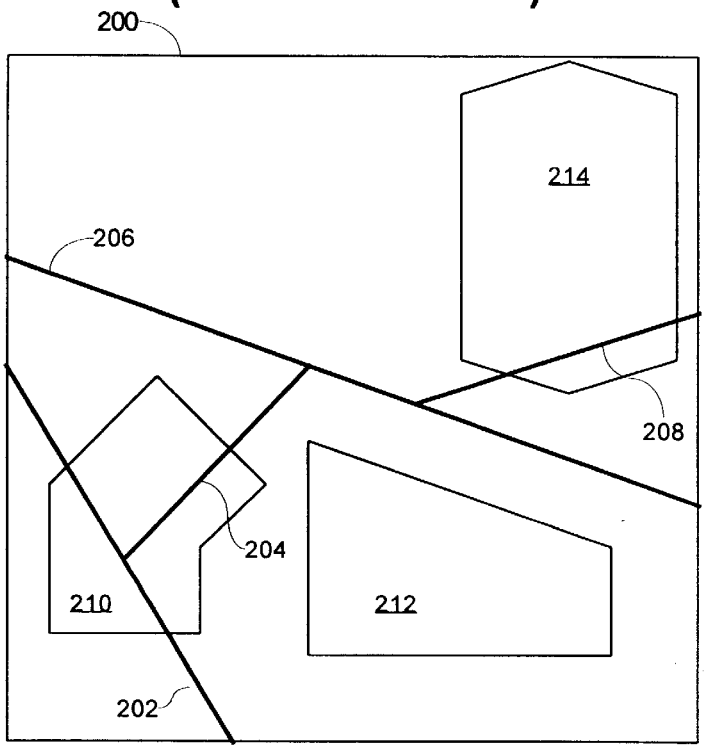
FIG. 2 depicts an exemplary space containing four roads and three parks in which a spatial join can be performed.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for spatial join processing. According to one embodiment of the invention, spatial join processing is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. One or more processors in a multi-processing arrangement may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for spatial join processing as described herein.

The received code may be executed by processor 104 as it is received, and/or stored in storage device 10, or other non-volatile storage for later execution. In this manner, computer system 100 may obtain application code in the form of a carrier wave.

Fixed-Size Cells

According to an aspect of the present invention, each object in the topological space is decomposed into cells that cover the object. A cell in an n-dimensional space is any maximally dimensioned region that is affinely isomorphic to a coordinate box at that dimension. Thus, such a cell may be defined as a set of points in a coordinate box, $\{(x_0, x_1, \ldots x_{n-1}) | \forall i: LO_i \leq x_i \leq HI_i\}$, where $LO_i < HI_i$. A cell in a two-dimensional space, e.g. a plane, is commonly called a "tile," and a cell in a three-dimensional space is commonly called a "cube." Notwithstanding the terms "tile" and "cube," cells need not be orthogonal and its dimensions may be of differing length. In fact, cells in two-dimensional space need not be four-sided. For example, three-sided (triangular) cells and six-sided (hexagonal) cells may be employed.

Figure 3A:
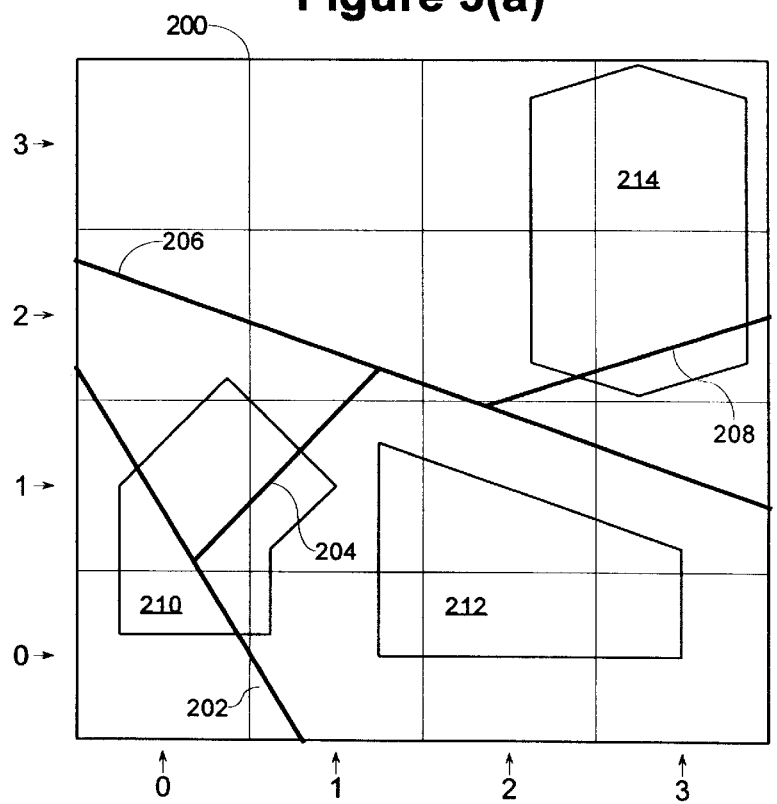
FIGS. 3(a), 3(b), and 3(c) depict a fixed-sized tiling of the exemplary space of FIG. 2 at two, three, and four levels of decomposition, respectively.
Figure 3B:
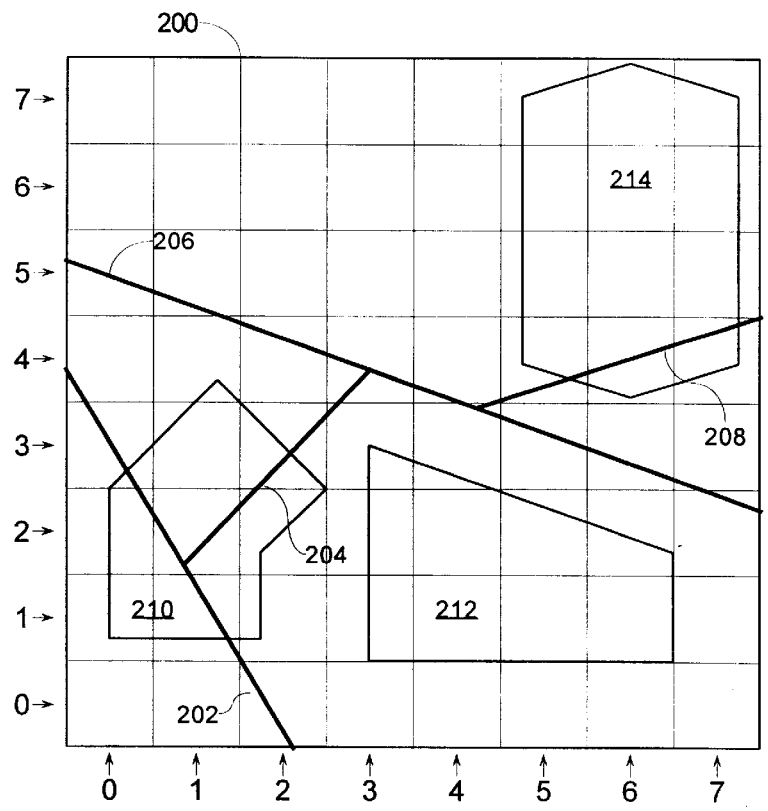
Figure 3C:
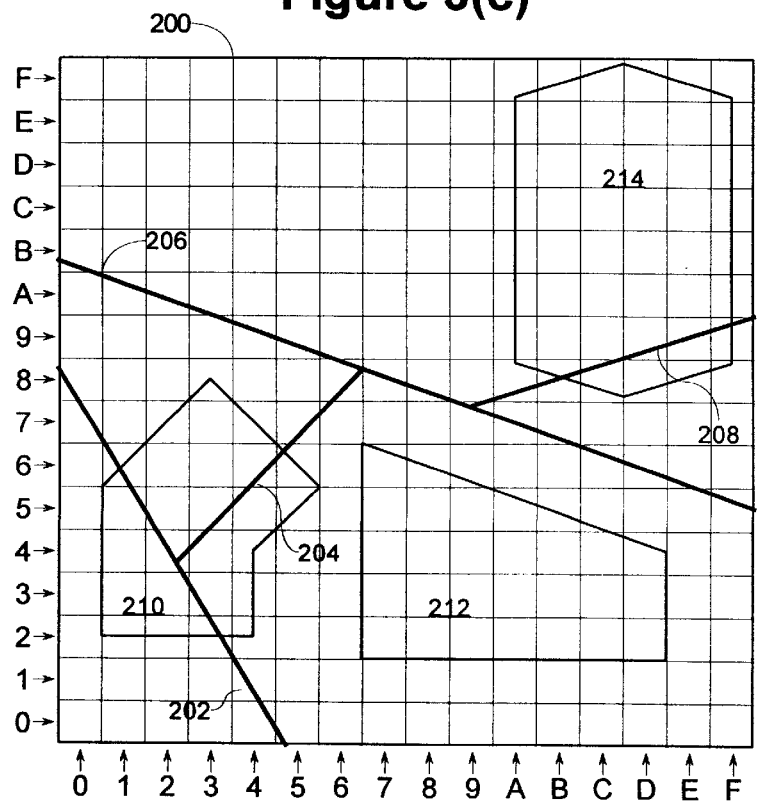

In the example, space 200 is hierarchically decomposed to two levels of fixed-size cells that cover the entire space. Referring to FIG. 3(*a*) the space 200 comprises sixteen cells, identified by concatenating the latitude code (from 0 to 3) with the longitude code (from 0 to 3). Thus, the lower-most, left-most cell is labeled 00 and the next lower-most, left-most cell is cell 10. Each spatial object, then, is located in one or more of the cells. For example, road 202 is located in cells 20, 10, 00, and 01, and park 210 is located in 00, 01, 10, 11, and 20.

Objects that share the same cell potentially interact with each other, and objects that do not have any cells in common do not interact with each other. Accordingly, determining whether two objects share the same cell is a valid primary filter, because objects that do not have any cells in common can be safely ignored, thereby reducing the number of queries in the secondary filter. In the example, if a road and a park do not share any cells in common, then it is safe to skip the range query for the road and the park. For example, road 202, which is covered by cells 20, 10, 00, and 01, does not share any cells in common with park 214, covered by cells 22, 23, 32, and 33. Thus, there is no need to perform a range query of road 202 on park 214.

Object Interaction with Fixed-Size Cells

Determining which of two sets of objects share cells can be accomplished by using a spatial index for each set of objects. A spatial index for a set of objects relates each object to the cells that cover the object. The object is identified by a foreign key to an object table or other identifier, and a cell that overlaps the object is identified by an appropriate key such as concatenation of coordinates or binary hyperspatial codes, which are described in more detail hereinbelow. If an object is covered by multiple cells, then there are multiple entries for the object corresponding to the respective cells. FIG. 4(*a*) depicts a spatial index 400 of the roads 202, 204, 206, and 208 in the exemplary space. Spatial index 400 contains four entries for road 202, because road 202 is covered by four cells 20, 10, 00, and 01. Road 204 is associated with three entries in spatial index 400 for cells 10, 11, and 21. Roads 206 and 208 have entries in spatial index 400 for five cells (20, 21, 22, 12, and 13) and three cells (12, 22, and 23), respectively. Thus, the number of entries in spatial index 400 totals to fifteen. FIG. 4(*a*) also depicts a spatial index 402 for the parks, which contains five entries for park 210 (cells 00, 01, 10, 11, and 20), six entries for park 212 (cells 01, 02, 03, 11, 12, and 13), and four entries for park 214 (cells 22, 23, 32, and 33), for a total of fifteen entries. Spatial Indexes 400 and 402 may be implemented by any of various techniques such as a B-tree index.

In order to ascertain which of two sets of objects have cells in common, an equijoin is performed on the respective spatial indexes, thereby producing a candidate collection of relations for the range queries. An equijoin is relational database procedure that combines data from two bodies of data using a predicate that tests for equality. A primary filter that employs an equijoin is particularly advantageous in improving the computing time characteristics of a spatial join, because an equijoin can be implemented very efficiently, in contrast with other kinds of join operations. An exemplary equijoin query for finding objects that interact within a cell is:

select distinct RX.road, PX.park from road index$_1$_RX, park_ index PX where RX.cell=PX.cell.

Results of performing the exemplary equijoin operation are illustrated as view 404 in FIG. 4(*a*), which lists nine candidate relations, consisting of two parks 210 and 212 for road 202, two parks 210 and 212 for road 204, three parks 210, 212, and 214 for road 206, and two parks 212 and 214 for road 208. Consequently, this primary filter step, using fixed-size cells of level two, eliminated the need to perform three range queries (for road 202 and park 214, road 204 and park 214, and road 208 and park 210) out of twelve in the secondary filter step. Therefore, this primary filter has a pass rate of 9/12=75%, whereas a "perfect" primary filter should pass only the three actual intersections 3/12=25%.

One way to bring the pass rate of the primary filter down to the actual pass rate is to increase the resolution of the decomposition and, thus, to use smaller sized cells. FIG. 3(*b*) depicts the exemplary space 200 hierarchically decomposed to three levels for a total of $(2^3)^2=64$ cells. With smaller cell sizes, some false positives are filtered out. For example, in FIG. 3(*a*) at two levels of decomposition, road 206 shares the same cell 22 as park 214, yet, in FIG. 3(*b*) at three levels of decomposition, road 206 does not have any cells in common with park 214. Consequently, reducing the size of the cells in the fixed-size cell equijoin can reduce the number of unnecessary range queries in the secondary filter. In this example, the number of candidates is reduced to seven for a 7/12 =58% pass rate. In one embodiment, the number of levels of decomposition and, hence, the size of the cells is configurable by a parameter, received from a user, which indicates the size of the of the fixed-size cell, either directly by a linear measurement, e.g., 5 mm, or indirectly by the number of levels of decomposition to be used.

A drawback with a pure fixed-size cell primary filter approach is scalability in storage size, especially in storing the spatial indexes. Referring to FIG. 4(*b*), it is evident that the size of the spatial indexes have greatly increased. Spatial index 410 for the roads has increased to 27 entries over the 15 entries for spatial index 400, and spatial index 412 for the parks has increased to 32 entries compared to the 15 entries of spatial index 402. In particular, park 212 has increased from six entries in spatial index 402 to ten entries in spatial index 412. Candidate view 414 containing the results, however, is smaller with seven entries, showing that the reduced cell size has improved the effectiveness of the primary filter pass. With even smaller cell sizes, illustrated in FIG. 3(*c*), the sizes of the road and park spatial indexes increase to 52 entries and 104 entries, respectively. The number of entries for park 212, in particular, has tripled from ten to thirty. At this resolution in this example, however, the pass rate is down to 3/12=25%, wherein the only objects that share tiles happen to be the ones which satisfy the spatial join relationship.

Therefore, use of fixed-size cells in a spatial index advantageously allows an efficient equijoin to be performed as a primary filter. However, it is desirable to improve the scalability of the primary filter in storage space, by reducing the number of entries in the spatial indexes, preferably, without sacrificing the precision and, hence, the filtering resolution of the spatial objects.

Variable-Size Cells

Figure 5A:
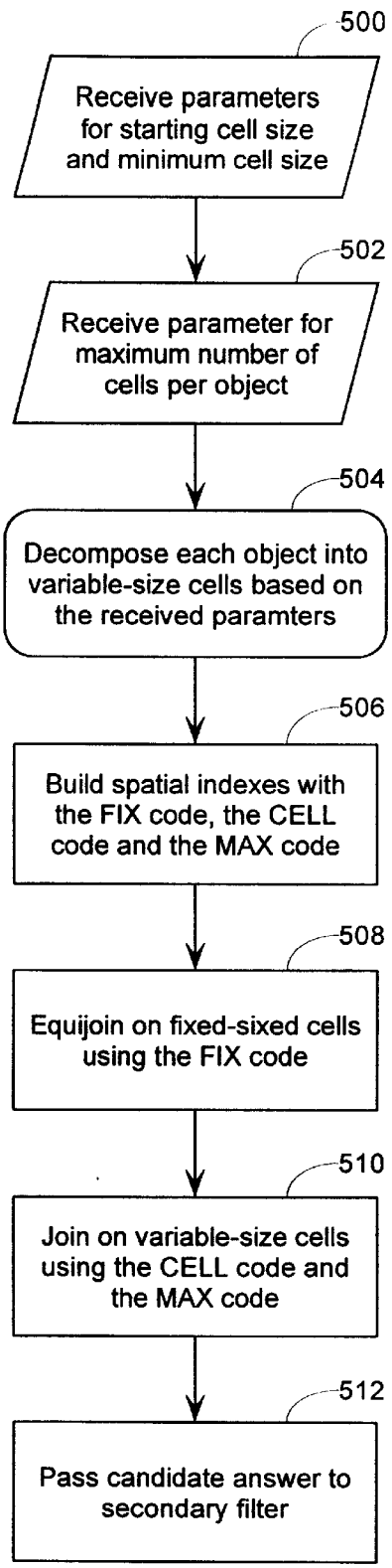
FIG. 5(a) is a flowchart illustrating an operation of a primary filter pass employing a hybrid fixed-size cell and a variable-size cell approach in accordance with an embodiment of the present invention.
Figure 5B:
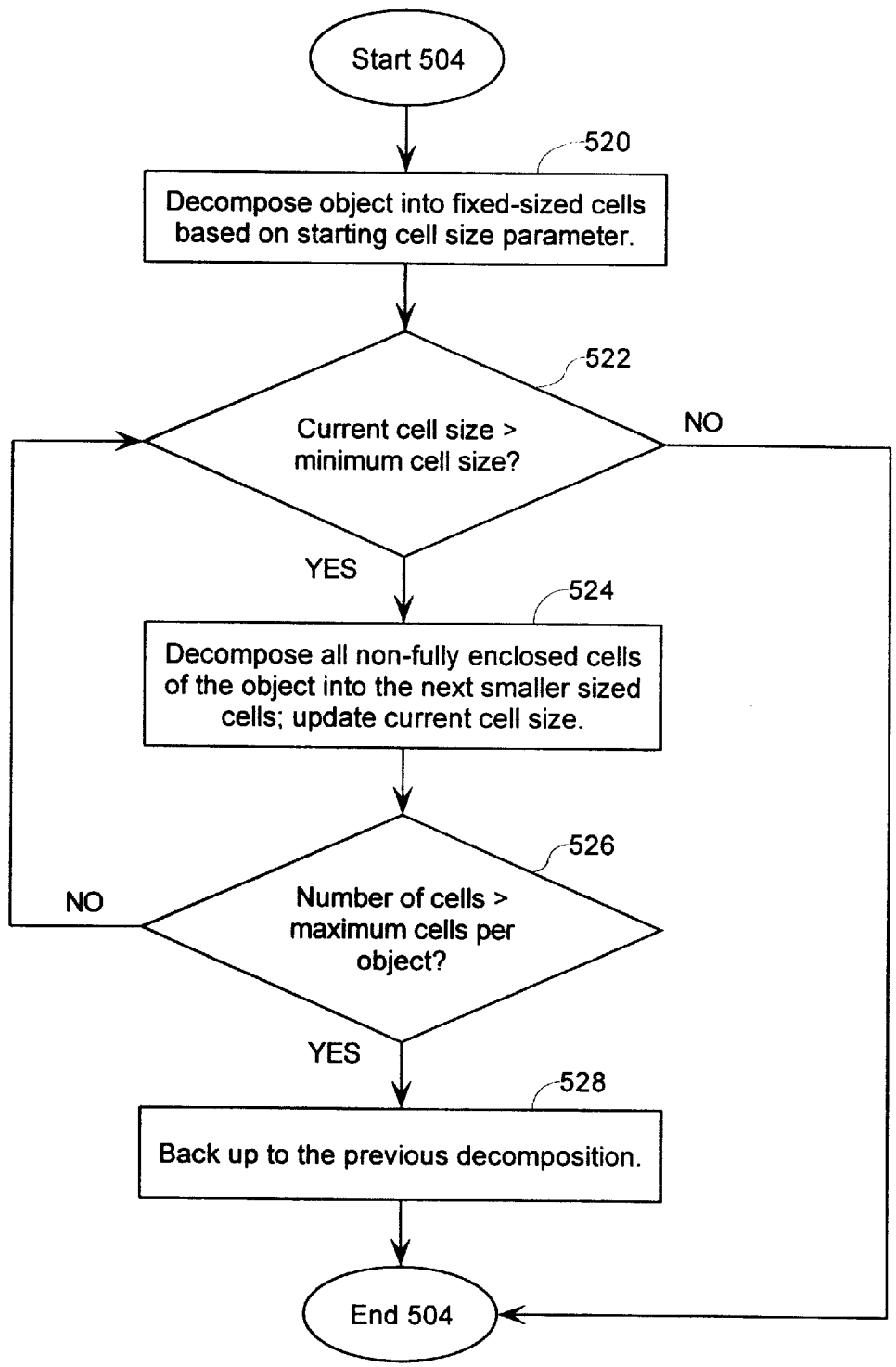
FIG. 5(b) is a flowchart illustrating an operation of decomposing an object according to a hybrid fixed-size cell and a variable-size cell approach in accordance with an embodiment of the present invention.

In accordance with an aspect of the invention, illustrated in the flowchart of FIG. 5(*a*), the above-described fixed-size cell approach is augmented by further decomposing the spatial objects into variable-size cells to improve the filtering resolution while maintaining the storage space scalability. With variable-size cells, smaller size cells can be coalesced into larger cells, thereby reducing the number of the cells that cover the object and, hence, saving entries in the spatial index. For example, four cells that form a square can be coalesced to form a larger size cell covering the square. Precision is maintained because the larger cells include only those smaller cells that actually cover the object.

Spatial indexes that describe objects decomposed into variable-size cells require a representation that can uniquely identify each variable-size cell. More specifically, the representation must indicate not only the location of the variable-size cell but also the size of the cell. Thus, identifying cells merely by their coordinates, as described hereinabove with respect to fixed-size cells, is inadequate because the coordinates only express the location of the cell but not the size. Though the present invention is not limited to any particular representation for variable-size cells, a preferred embodiment of the present invention employs binary hyperspatial codes, hereinafter "BH codes," which are described in the commonly assigned, U.S. patent application Ser. No. 08/827,987, entitled "Method and Apparatus for Multidimensional Database Using Binary Hyperspatial Code" filed on Oct. 2, 1996 by Edric Keighan, Panagiotis A. Vretanos, and Michael Galluchon, the contents of which are incorporated by reference herein.

BH codes model a regular, recursive decomposition of a space into a plurality of subcells formed by dividing each coordinate direction in half. A two-dimensional space is subdivided into four rectangular subcells, commonly called a quadtree, and, an n-dimensional space is divided into $2^n$ subcells. Each subcell may be further subdivided into additional $2^n$ subcells as necessary. Depending on the resolution desired, there is no theoretical limit to the number of decomposition levels available, but practically the number of levels is limited by the particular computer system utilized. A thirty-two level decomposition of the world's surface is capable of attaining a resolution of 9.3 mm×4.7 mm. Thus, BH codes indicate an orderly decomposition of space.

Each subcell at a level of decomposition in a space is identified by a binary bit pattern having the same number of bits as number of dimensions of the space. Each bit indicates which of the two divisions in the corresponding dimension in which the cell is located. For example, the four subcells of a two-dimensional space are each identified by two bits, wherein one of the bits indicates which of the two divisions of one coordinate dimension (e.g., latitude) and the other bit indicates which of two divisions of the other coordinate dimension (e.g., longitude). More specifically, the lower-left subcell may be identified by the binary number 00, the lower-right subcell by the binary number 01, and the upper-left subcell and the upper-right subcell by the binary numbers 10 and 11, respectively. Each subcell, however, is conveniently identified by the quaternary digits 0, 1, 2, 3 (in base 4), corresponding to the binary numbers 00, 01, 10, and 11, respectively. As another example, the eight cells of a subdivided three-dimensional volume are identified by a three digit binary number, typically expressed as an octal digit 0–7.

Figure 6:
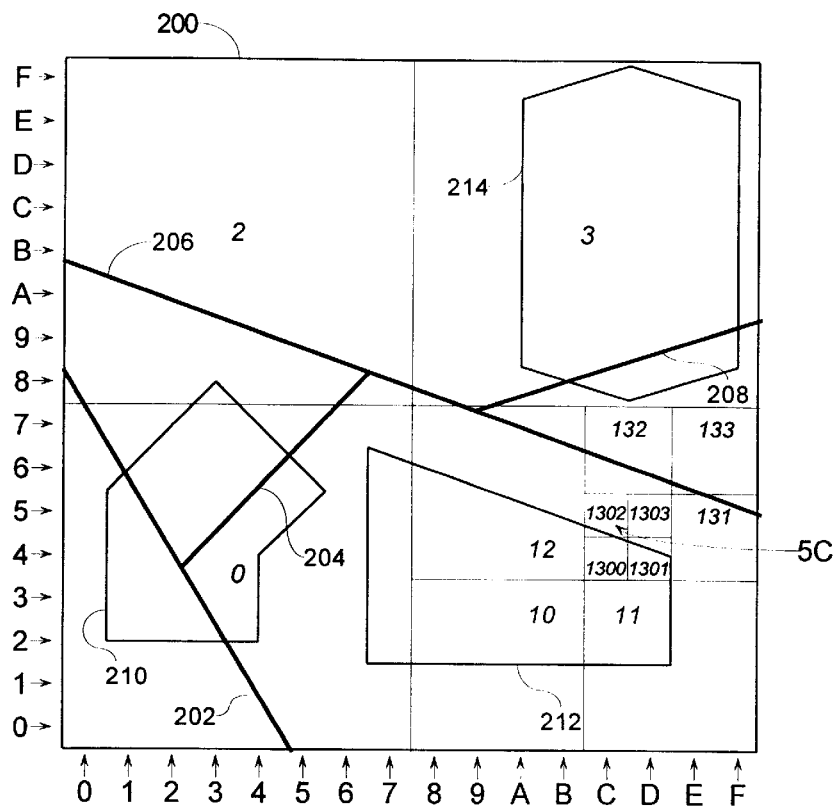
FIG. 6 illustrates a recursive decomposition of the exemplary space depicted in FIG. 2 into variable-size cells, identified by a binary hyper-spatial code in accordance with an embodiment of the present invention.
Figure 7A:
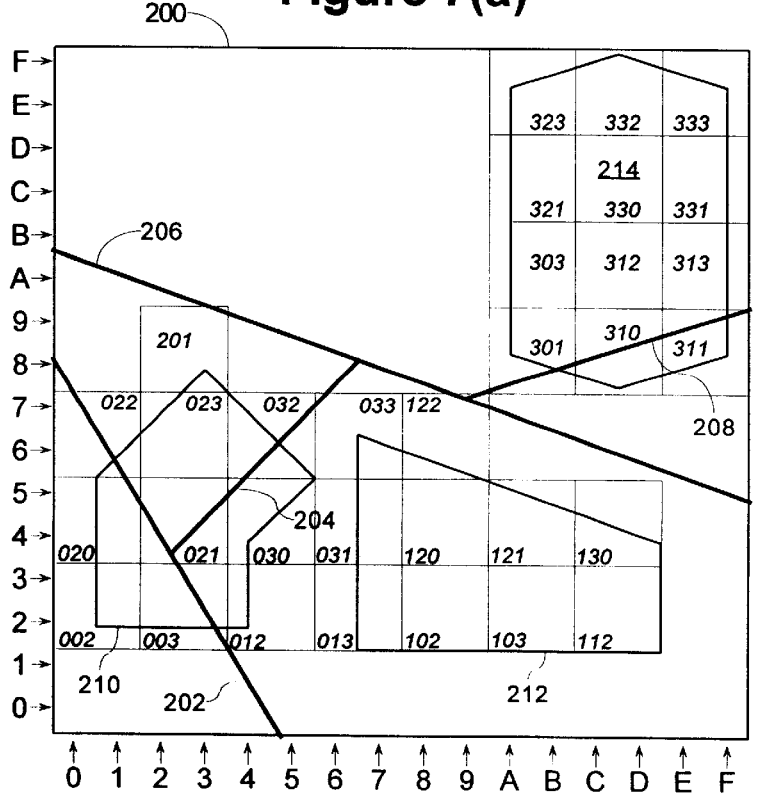
FIGS. 7(a)–7(e) illustrate a variable-sized tiling of the exemplary spatial objects of FIG. 2 in accordance with an embodiment of the present invention.
Figure 7B:
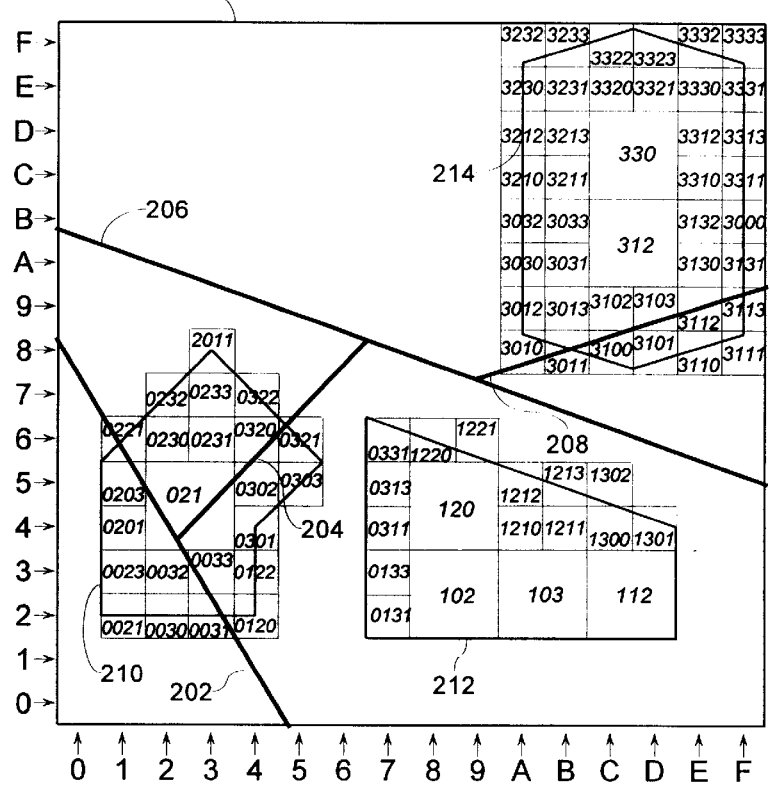
Figure 7C:
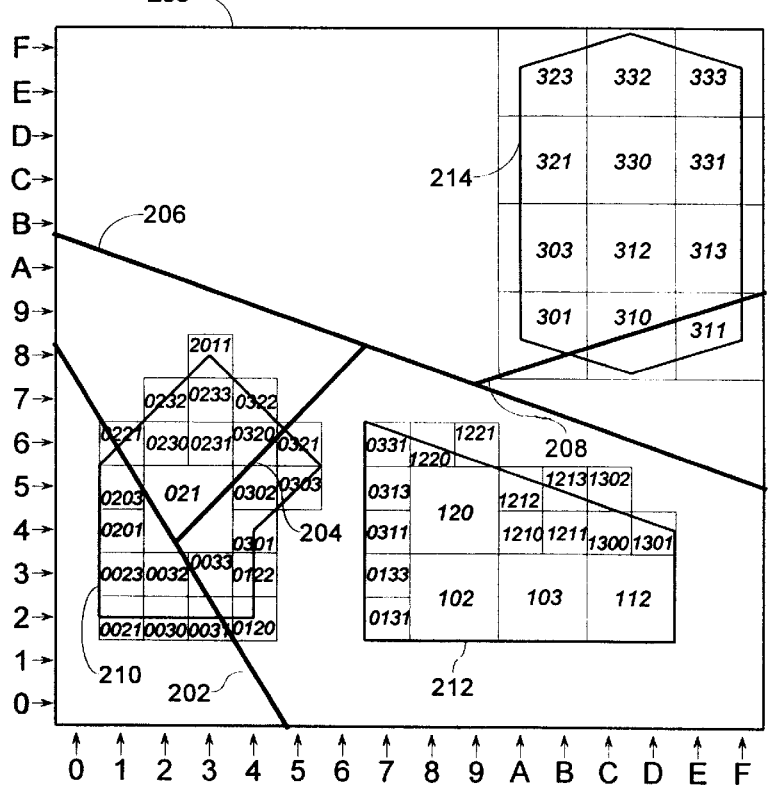
Figure 7D:
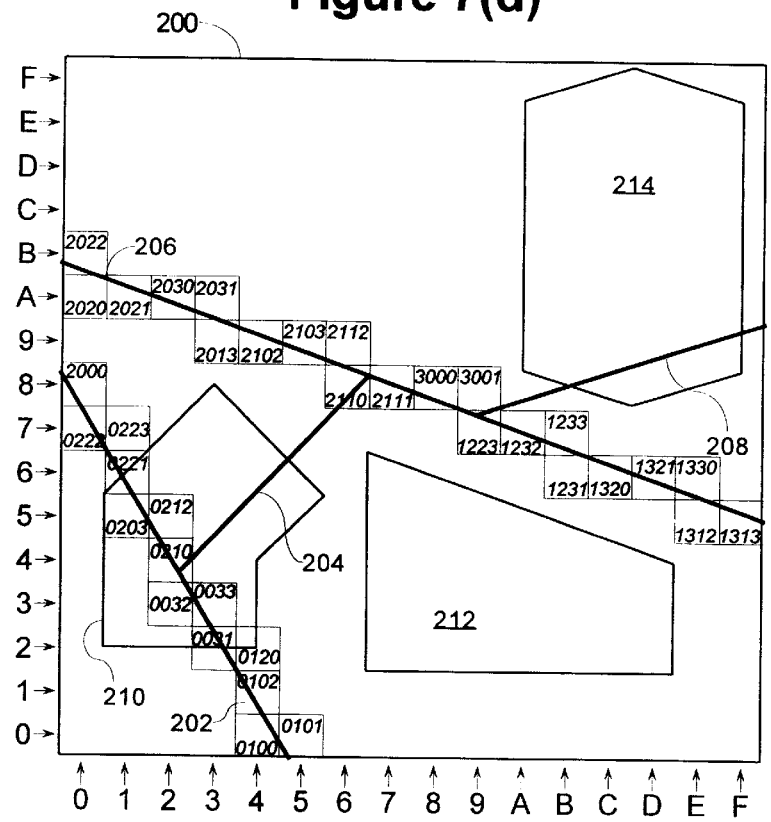
Figure 7E:
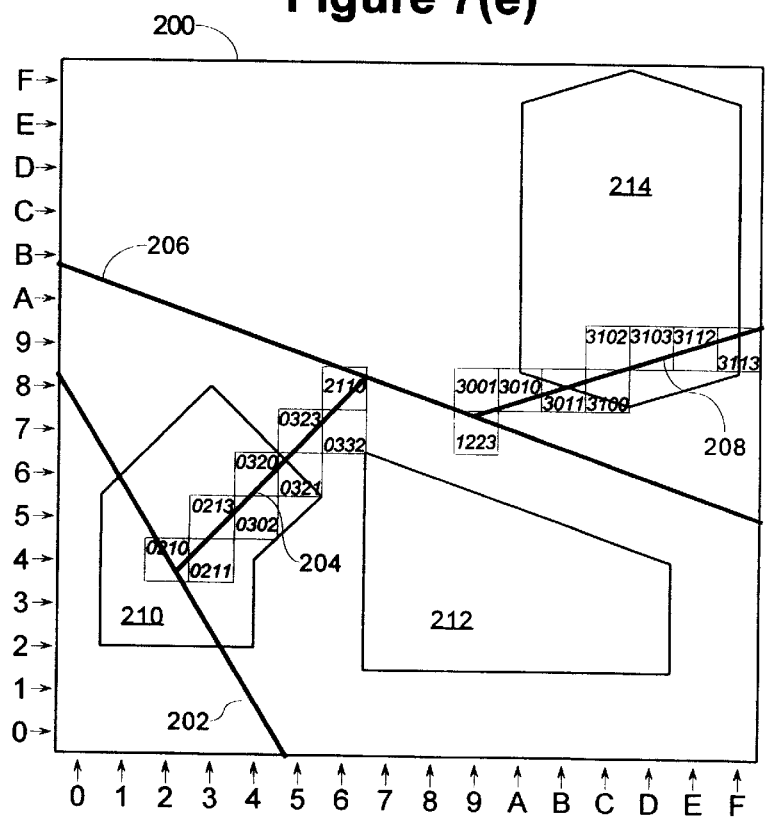

Since BH codes model a recursive decomposition of a space, the BH codes themselves may be defined recursively. Specifically, the BH code for a cell is defined by concatenating the BH code digits of its supercell with the appropriate bits for the cell at the current level. For example, the upper-left subcell of cell 130 is 1302, because the code 2 denotes the upper-left subcell of any cell. Referring to FIG. 6, the exemplary space 200 is recursively subdivided into subcells and labeled by an appropriate BH code in Italics. At the first level of decomposition in the example, the lower-left subcell, which includes most of road 202 and park 210, is labeled 0 and the upper-right subcell, which includes the park 214, is labeled 3. The lower-right subcell of FIG. 6 is further decomposed into four subcells, of which the lower-left is labeled 10.

BH codes can indicate any cell at any level of decomposition simply by concatenating enough digits. For example, referring again to FIG. 6, cell 5C of the coordinate-style representation has a BH code of 1302 because cell 5C is located in the lower-right cell (1) of the first level, then the upper-right cell (3) of the second level, then the lower-left cell (0) of the third level, and finally the upper-left cell (2) of the fourth level. A computer system, however, need not explicitly perform this recursive process to obtain the BH code, because the BH code can obtained iteratively by interleaving the bits of the coordinates at the appropriate level of resolution. For example, cell 5C has coordinates 0101 and 1100, expressed in the binary number system. Interleaving the bits 0101 (for 5) with 1100 (for C=12), yields the binary number 01110010. By grouping pairs of bits in the interleaved binary number as 01,11,00,10, the BH code of 1302 is obtained.

Therefore, BH codes constitute a suitable representation for variable-size cells. The number of digits in the BH code for a cell indicates the level of decomposition and, hence, the resolution of the cell. For example, cell 1302 has a smaller size than cell 130. The particular values of the digits in the BH code representation of a cell indicate the location of the cell in the space. For example, cell 1302 is located at a different position in a space than cell 0123.

Decomposition into Variable-Sized Cells

Referring back to FIG. 5(*a*), the decomposition of the spatial objects are configured by parameters, received according to one embodiment of the present invention from a user or database administrator. In step 500, the parameters for starting cell size in decomposing spatial objects and the smallest possible cell size received. These parameters may indicate the cell sizes, directly by a linear measurement, e.g., 5 mm, or indirectly by the number of levels of decomposition to be used or number of allowable digits in the BH code. In step 502, a parameter is received for controlling the variable-size cell decomposition, in one embodiment, indicating a desired maximum number of cells per object. After these parameters have been received, each object is decomposed into variable-size cells based on these parameters (step 504), on method of which is described in more detail in FIG. 5(*b*).

For purposes of illustration, a working example of decomposition of spatial objects into to variable size cell is explained with reference to the exemplary space 200, and the following parametric values: a starting cell size corresponding to three levels of decomposition, a minimum cell size corresponding to four levels of decomposition, and a maximum cell number of 32 per object. The present invention, of course, is not limited to these particular parametric values, and, in fact, the appropriate values will vary from spatial data set to spatial data set. Typically, however, the minimum cell size is as small as practical and much smaller than the starting cell size, and the starting cell size is smaller than the entire space, for example at least three levels of decomposition from the space or universe.

At step 520, the spatial object is decomposed into fixed-size cells based on the starting cell size parameter in accordance with the fixed-size cell described hereinabove. Referring to FIG. 7(*a*), at an initial three levels of decomposition, park 210 of the working example is decomposed into ten (10) fixed-size cells 002, 003, 012, 020, 021, 030, 022, 023, 032, and 201. Park 212 is also decomposed into ten (10) fixed-size cells 013, 102, 103, 112, 031, 120, 121, 130, 033, and 122, and park 214 is decomposed into twelve (12) fixed-size cells 301, 310, 311, 303, 312, 313, 321, 330, 331, 323, 332, and 333.

Referring back to FIG. 5(*b*), the current cell size is compared against the minimum cell size (step 522). If the current cell size has reached the minimum cell size, no further decomposition is possible, and, accordingly, the decomposition procedure ends for the object. In the working example, the starting cell size (3 levels) is larger than the minimum cell size (4 levels), thus execution branches to step 524 where all cells of the object that are not fully enclosed by the object are decomposed into the next smaller size cells. This next smaller cell size becomes the current cell size. In FIG. 7(*b*), cell 021 of park 210 is fully enclosed and therefore is not decomposed; however, the remaining cells of park 210 are decomposed for a total of twenty-three (23) cells. For park 212, four cells 102, 103, 112, and 120 are fully enclosed, but the remaining cells are decomposed to create a total of eighteen (18) cells. Finally, all but fully enclosed cells 312 and 330 of park 214 are decomposed, yielding a total of forty-two (42) cells.

Referring back to FIG. 5(*b*), the number of cells for each object is checked against the maximum cells per object parameter. For the exemplary value of 32, park 210 and park 212, having twenty-three (23) and eighteen (18), do not exceed the maximum cells per object parameter. Accordingly, execution for these objects loops back to step 522 for another round of decomposition. In this example, the test in step 522 determines that the minimum cell size has been reached, thus the decomposition for parks 210 and 212 terminates. On the other hand, park 214 has forty-two (42) variable-size cells, which exceeds the maximum cell parameter of thirty-two (32). In this case, execution branches to step 528 where the previous decomposition is adopted for the object, which, for park 214, is twelve (12) cells all of length 3.

The use of variable-size cells achieves the largest reduction in the number of cells of maximally dimensioned objects. Thus, in a two-dimensional space, areas and polygons benefit the most in reducing the number of cells with a variable-size cell approach, but one-dimensional lines and zero-dimensional points tend to benefit less. Referring to FIG. 7(*d*), it is evident that there are no groups of cells for road 202, comprising fourteen (14) cells, and road 206, comprising twenty-two (22) cells, that qualify for coalescing to a larger cell. Furthermore, in FIG. 7(*e*), road 204 is covered by nine (9) cells and road 208 is covered by nine (9) cells. While a straight line can often cut through three cells of a supercell, it can only cut through all four cells if it intersects their common corner. Curved lines, such as splines, on the other hand, are capable of utilizing all four subcells of a supercell and therefore can achieve a reduction in storage space of the spatial index.

Object Interaction with Variable-Size Cells

As with fixed-size cells, determining which of two sets of objects share variable-size cells can be accomplished by using a spatial index for each set of objects, which relates each object to the variable-size cells that cover the object. The object is identified by a foreign key to an object table or other identifier, and a variable-size cell that overlaps the object is identified by an appropriate key, such as its BH code. Since an object is typically covered by multiple variable-size cells, then there are multiple entries for the object corresponding to the respective variable-size cells. Spatial indexes may be implemented by any of various techniques such as a B-tree.

To facilitate the process of determining which objects share overlapping cells when the cells are variable in size, a maximum BH code for each cell is preferably generated and stored in the spatial index. The maximum BH code for a cell is derived by padding the normal BH code for the cell with all "1" bits out one place further than the longest allowable BH code for the index. For example, in a two-dimensional space decomposed to three levels, a BH code of 01 for a size tile has a maximum BH code of 0133, because the 3 codes are all "1" bits. As another example, in a three-dimensional space decomposed to five levels, a BH code of 36071 for a cube has a maximum BH code of 360717, which a 7 being all "1" bits in three dimensions.

FIG. 8 depicts a portion of a spatial index 800 showing entries belonging to road 202 in the exemplary space 200. Spatial index 800 contains fourteen (14) entries for road 202, because road 202 is covered by fourteen cells 2000, 0222, 0223, 0221, 0203, 0212, 0210, 0032, 0033, 0031, 0120, 0102, 0100, and 0101. Each entry contains the following attributes: an identifier to indicate a road (labeled ROAD), a BH code to indicate a cell that covers the road (labeled CELL), and the corresponding maximum BH code (labeled MAX). For example, entry 810 of spatial index 800 contains an identifier indicating road 202, a BH code of 0212 to indicate a variable-size cell at resolution of four levels, and a maximum BH code of 02123. Not shown in FIG. 8 for reasons of economy are nine (9) entries for road 204, twenty-two (22) entries for road 206, and eight (8) entries for road 208, for a total of fifty-one (51) entries.

FIG. 8 also depicts a portion of spatial index 802 for park 210, comprising twenty-three (23) entries. Each entry contains at least the following attributes: an identifier to indicate a road (labeled PARK), a BH code to indicate a cell that covers the road (labeled CELL), and the corresponding maximum BH code (labeled MAX). For example, entry 812 of spatial index 802 contains an identifier indicating park 210, a BH code of 021 to indicate a variable-size cell, and a maximum BH code of 02133. Not shown in FIG. 8 for reasons of economy are eighteen (18) entries for park 212, and twelve (12) entries for park 214, for a total of fifty-three (53) entries.

In order to ascertain which of two sets of objects have cells in common, a relational database join operation is performed on the respective spatial indexes, thereby producing a candidate collection of relations for the range queries. A join is relational database procedure that combines data from two bodies of data using a predicate that examines the attributes of an object. For variable-size cells, the join predicate is configured to determine whether one cell is equal to, contained in, or contains another cell. One approach to making this determination is check whether the BH code for one cells is between the BH code for the other cell and the maximum BH code, as in the following exemplary join query:

select distinct RX.road, PX.park from road_index RX, park_index PX where (RX.cell between PX.cell and PX.max) or (PX.cell between RX.cell and RX.max).

The effectiveness of this predicate is illustrated with respect to entry 810 of spatial index 800 and entry 812 of spatial index 802. The BH code for a cell of road 202 in entry 810 is 0212. For entry 812, the BH code for a larger cell of park 210 is 021 and the cached maximum BH code is 02133. Since cell 021 contains cell 0212, a valid predicate should evaluate to true. In this example, the predicate (RX.cell between PX.cell and PX.max) or (PX.cell between RX.cell and RX.max) is satisfied because 0212 is between 021 and 02133.

Generally, the variable-size cell approach requires much less storage than the fixed-size cell approach. For the exemplary space 200, the fixed-size cell approach requires 51+104=155 entries in the spatial indexes, while the variable-size cell approach required only 51+53=104 entries in the spatial indexes. The fixed-size cell approach is not scalable in terms of storage space, because an increase in the resolution of the cells results in a disproportionate increase in the number of entries in the spatial index. For example, doubling the precision of the cells in a two-dimensional tends to cause the number of cells per region to increase by a factor of four. On the other hand, the variable-size cell approach is scalable in terms of storage space, because the number of entries of the spatial indexes tends to be proportional to the number of objects and not as dependent on the resolution scale. This improved scalability is due to the step of determining an appropriate resolution for the variable-size cells of an object based on the parameter indicating a desired maximum number of variable-size cells per object.

A drawback with a pure variable-size cell primary filter approach is its scalability in terms of computing time. Unlike the fixed-size cell approach, the variable-size cell approach does not use the efficient equijoin database operation, because the predicate does not use the equality operation. Consequently, the variable-size cell approach utilizes less computationally scalable techniques, such as a quadratic nested loop join. Therefore, there is a need for a mechanism for performing spatial joins, that can achieve the computational scalability of fixed-size cell approach while attaining the storage scalability of the variable-size cell approach.

Hybrid Spatial Indexing

Accordingly, one embodiment of the present invention employs a hybrid approach for processing a spatial join that combines the benefits the fixed-sized cell approach with the benefits of the variable-size cell approach. More specifically, spatial objects are decomposed in accordance with the variable-size cell approach and stored in a spatial index. However, the spatial index is augmented to include an extra column for a corresponding fixed-size cell at a coarse level of resolution. Thus, an equijoin operation can be performed on the fixed-size cell column as a first pass to filter out a number of candidate answers, before invoking the non-equijoin operation in a second pass to select the final candidate answers at smaller cell sizes.

Referring again to FIG. 5(a), hybrid spatial indexes are built for the decomposed objects (step 506), each object having entries for the respective variable-size cells that cover the object. The hybrid spatial index includes an identifier for the object, a code for the variable-size cell, a maximum code for the variable-size cell, and a code for the fixed-size cell at the starting cell size that includes the variable-size cell. The code for the variable-size cell and the corresponding maximum code are preferably a BH code and a padded BH code, as described hereinabove. Although the code for the starting fixed-size cell can be in any format that allows the use of an equality predicate, e.g., a concatenation of coordinates, the fixed-size cell code is preferably derived by truncating the BH code for the variable-size cell to the number of places indicated by the starting cell size.

For example, FIG. 8 depicts portions of hybrid spatial indexes 800 and 802 for roads and parks, respectively, based upon a starting cell size parameter corresponding to three levels of decomposition. Referring to entry 810 of hybrid spatial index 800, the fixed-size cell code for variable-size cell 0212 of road 202 is 021, because the BH code of 0212 is truncated to the three places indicated by the starting cell size parameter. Similarly, entry 812 for park 210 of hybrid spatial index 802 contains a fixed-size cell code of 021 because the variable-size cell BH code is 021.

Referring back to FIG. 5(a), a spatial data processing system according an embodiment of the present invention is ready to process a spatial join on the two sets of related objects to determine which objects of the two sets interact with each other according to a spatial predicate. A primary filter is applied to the corresponding hybrid spatial indexes in two passes. The first pass (step 508) selects pairs of objects, one from one set of objects in the spatial join and one from the other set of objects of the spatial join, if the objects share any fixed-size cells. More specifically, these selected pairs are preferably chosen by an equijoin operation on the fixed-size cell code (FIX) columns of the spatial indexes to produce a first set of candidate pairs. Referring again to FIG. 8, first candidate view 804 illustrates a reduced set of candidate pairs produced by an equijoin operation on spatial index 800 and spatial index 802. For example, candidate pair 814 specifying road 202 and park 210 was selected because entry 810 for road 202 and entry 812 for park 210 both contain a fixed-size cell BH code of 021.

Referring back to FIG. 5(a), the second pass (step 510) selects a second set of candidate pairs, from among the first set of candidate pairs, that have overlapping variable-size cells. This pass may be accomplished as described hereinabove by checking if the variable-size cell BH code for one object is between the variable-size cell BH code and the corresponding maximum BH code for the other object. Referring again to FIG. 8, second candidate view 806 illustrates a further reduced set of candidate pairs produced by an join operation of the candidate pairs chosen from spatial index 800 and spatial index 802. For example, second candidate pair 816 specifying road 202 and park 210 was selected because entry 810 for road 202 contains a variable-size cell BH code of 0212, which was between variable-size cell BH code 021 and corresponding maximum BH code 02133 of entry 812 for park 210.

While these two passes can be implemented as separate queries, preferably the predicates are combined into the following single query and submitted to a relational database server:

select distinct RX.road, PX.park from road_index RX, park_index PX where (RX.fix=PX.fix)

and ((RX.cell between PX.cell and PX.max) or (PX.cell between RX.cell and RX.max)).

The relational database system can be configured to recognize that the first predicate (RX.fix=PX.fix) uses an equality operator and, thence, schedule an efficient equijoin operation, whose results are subsequently checked to determine whether the other predicate is satisfied. At step 512, the primary filter pass is complete and the candidate answers are passed to the secondary filter, where an "exact" spatial analysis is performed on the candidate answer to complete the request spatial join. For example, each of the three candidate pairs shown in view 806 of FIG. 9 would be tested by the "exact" and more computationally expensive techniques such as a range query to see if the roads actually intersects the parks.

Use of a hybrid spatial index for spatial objects allows the spatial objects to be decomposed into variable-size cells for storage scalability while realizing the benefits of high-resolution. Since each entry in the hybrid spatial index also includes a fixed-size cell code, an efficient equijoin operation can be performed first to determine which objects interact with each other for computational scalability. While conventional attempts tend to have log-linear or even quadratic running times, the highly selective fixed-size cell equijoin is roughly linear.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims. For example, embodiments of the present invention have been described with respect to relational database systems. However, the present invention is also applicable to other spatial data processing systems such as a "geographic information system" (GIS). What are referred as "objects" or "spatial objects" herein correspond to "features" in GIS, and what are referred to as a "set of objects" or "a set of related objects" herein correspond to "themes" in GIS.

What is claimed is:

1. A method of determining which of a plurality of first objects interacts within a space with which of a plurality of second objects according to a spatial predicate, said method comprising the computer-implemented steps of:

decomposing the plurality of first objects and the plurality of second objects into respective sets of one or more cells, wherein each cell of the respective sets of one or more cells defines a region in said space and has a cell size no larger than a predetermined cell size;

filtering from among pairs of the first objects and second objects, respectively, to determine first candidate pairs of the first objects and the second objects, respectively, that share common cells at the predetermined cell size, and filtering from among the first candidate pairs of the first objects and second objects, respectively, to determine second candidate pairs of the first objects and the second objects, respectively, that share overlapping cells of cell sizes smaller than the predetermined cell size; and selecting from among the second candidate pairs resulting pairs of the first objects and the second objects that indicate a first object that interacts with the second object according to the spatial predicate.

2. The method of claim 1, further comprising the steps of:

receiving a first input indicative of said predetermined cell size; and receiving a second input indicative of a number of cells;

wherein the step of decomposing the plurality of first objects and the plurality of second objects into respective sets of one or more cells includes the step of decomposing the plurality of first objects and the plurality of second objects into the respective sets of one or more cells based on the first input and the second input.

3. The method of claim 2, further comprising the steps of:

generating codes for corresponding cells of said respective sets of one or more cells of the plurality of first objects and the plurality of second objects, said codes identifying a location and a size of the corresponding cell within said space; and building a first spatial index and a second spatial index based on said codes.

4. The method of claim 3, wherein the step of generating codes for corresponding cells includes the step of generating binary hyperspatial codes for the corresponding cells.

5. The method of claim 3, wherein the step of filtering pairs of the first objects and the second objects, respectively, includes the step of filtering said pairs based on said first spatial index and said second index.

6. The method of claim 5, wherein the step of determining second candidate pairs of the first objects and the second objects, respectively, that indicate a first object and a second object that share overlapping cells at cell sizes smaller than the predetermined cell size includes the step of determining said second candidate pairs of the first objects and the second objects by performing a join operation on the first spatial index and the second spatial index.

7. The method of claim 6, further comprising the step of:

generating second codes for the corresponding cells of said respective sets of one or more cells of the plurality of first objects and the plurality of second objects, said second codes identifying a location of a cell at said predetermined cell size containing the respective cell;

wherein the step of building a first spatial index and a second spatial index based on said codes includes the step of building said first spatial index and said second spatial index based on said codes and said second codes.

8. The method of claim 7, wherein the step of generating second codes for the corresponding cells includes the step of truncating corresponding codes for the corresponding cells to a prescribed number of digits based on said predetermined cell size.

9. The method of claim 8, wherein the step of determining first candidate pairs of the first objects and the second objects, respectively, includes the step of determining first candidate pairs of the first objects and the second objects, respectively, by an equijoin operation on the first spatial index and a second spatial index using the second codes.

10. A computer-readable medium bearing instructions for determining which of a plurality of first objects interacts within a space with which of a plurality of second objects according to a spatial predicate, said instructions, when executed by one or more processors, arranged to cause the one or more processors to perform the steps of:

decomposing the plurality of first objects and the plurality of second objects into respective sets of one or more cells, wherein each cell of the respective sets of one or more cells defines a region in said space and has a cell size no larger than a predetermined cell size;

filtering from among pairs of the first objects and second objects, respectively, to determine first candidate pairs of the first objects and the second objects, respectively, that share common cells at the predetermined cell size, and filtering from among the first candidate pairs of the first objects and second objects, respectively, to determine second candidate pairs of the first objects and the second objects, respectively, that share overlapping cells of cell sizes smaller than the predetermined cell size; and selecting from among the second candidate pairs resulting pairs of the first objects and the second objects that indicate a first object that interacts with the second object according to the spatial predicate.

11. The computer-readable medium of claim 10, wherein said instructions are further arranged to cause the one or more processors to perform the steps of:

receiving a first input indicative of said predetermined cell size, and receiving a second input indicative of a number of cells; and wherein the step of decomposing the plurality of first objects and the plurality of second objects into respective sets of one or more cells includes the step of decomposing the plurality of first objects and the plurality of second objects into the respective sets of one or more cells based on the first input and the second input.

12. The computer-readable medium of claim 11, wherein said instructions are further arranged to cause the one or more processors to perform the steps of:

generating codes for corresponding cells of said respective sets of one or more cells of the plurality of first objects and the plurality of second objects, said codes identifying a location and a size of the corresponding cell within said space; and building a first spatial index and a second spatial index based on said codes.

13. The computer-readable medium of claim 12, wherein the step of generating codes for corresponding cells includes the step of generating binary hyperspatial codes for the corresponding cells.

14. The computer-readable medium of claim 12, wherein the step of filtering pairs of the first objects and the second objects, respectively, includes the step of filtering said pairs based on said first spatial index and said second index.

15. The computer-readable medium of claim 14, wherein the step of determining second candidate pairs of the first objects and the second objects, respectively, that indicate a first object and a second object that share overlapping cells at cell sizes smaller than the predetermined cell size includes the step of determining said second candidate pairs of the first objects and the second objects by performing a join operation on the first spatial index and the second spatial index.

16. The computer-readable medium of claim 15, wherein said instructions are further arranged to cause the one or more processors to perform the steps of:

generating second codes for the corresponding cells of said respective sets of one or more cells of the plurality of first objects and the plurality of second objects, said second codes identifying a location of a cell at said predetermined cell size containing the respective cell;

wherein the step of building a first spatial index and a second spatial index based on said codes includes the step of building said first spatial index and said second spatial index based on said codes and said second codes.

17. The computer-readable medium of claim 16, wherein the step of generating second codes for the corresponding cells includes the step of truncating corresponding codes for the corresponding cells to a prescribed number of digits based on said predetermined cell size.

18. The computer-readable medium of claim 17, wherein the step of determining first candidate pairs of the first objects and the second objects, respectively, includes the step of determining first candidate pairs of the first objects and the second objects, respectively, by an equijoin operation on the first spatial index and a second spatial index using the second codes.

19. A method of performing a spatial join according to a spatial predicate of a set of first objects and a set of second objects, comprising the computer-implemented steps of:

building a first spatial index for the set of first objects, said first spatial index including an entry indicating an identifier for one of the first objects, a fixed-length code identifying a location of a cell in which at least part of the one of the first object exists, and a variable-length code identifying a location of a cell in which at least part of the one of the first object exists;

building a second spatial index for the set of second objects, said second spatial index including an entry indicating an identifier for one of the second objects, a fixed-length code identifying a location of a cell in which at least part of the one of the second object exists, and a variable-length code identifying a location of a cell in which at least part of the one of the second object exists;

performing a first join operation on the first spatial index and the second spatial index based on the fixed-length codes;

performing a second join operation on results of the first join operation based on the variable length codes; and performing a spatial join operation on results of the second join operation based on the spatial predicate.

20. The method of claim 19, wherein the step of performing the first join operation includes the step of performing an equijoin operation.

21. The method of claim 19, wherein the variable-length codes contains as least as many digits the fixed-length codes.

22. A computer-readable medium bearing instructions for performing a spatial join according to a spatial predicate of a set of first objects and a set of second objects, said instructions arranged, when executed by one or more processors, to cause the one or more processors to perform the steps of:

building a first spatial index for the set of first objects, said first spatial index including an entry indicating an identifier for one of the first objects, a fixed-length code identifying a location of a cell in which part of the one of the first object exists, and a variable-length code identifying a location of a cell in which part of the one of the first object exists;

building a second spatial index for the set of second objects, said second spatial index including an entry indicating an identifier for one of the second objects, a fixed-length code identifying a location of a cell in which part of the one of the second object exists, and a variable-length code identifying a location of a cell in which part of the one of the second object exists;

performing a first join operation on the first spatial index and the second spatial index based on the fixed-length codes;

performing a second join operation on results of the first join operation based on the variable length codes; and performing a spatial join operation on results of the second join operation based on the spatial predicate.

23. The computer-readable medium of claim 22, wherein the step of performing the first join operation includes the step of performing an equijoin operation.

24. The method of claim 22, wherein the variable-length codes contains as least as many digits the fixed-length codes.

25. A method of performing a spatial join according to a spatial predicate of a set of first objects and a set of second objects, comprising the computer-implemented steps of:

performing a first join operation between the set of first objects and the set of second objects based on fixed-length codes identifying cells in which at least part of the first objects and second objects exist;

performing a second join operation on results of the first join operation based on the variable length codes identifying cells in which at least part of the first objects and second objects exist; and performing a spatial join operation on results of the second join operation based on the spatial predicate.

26. The method of claim 25, wherein the step of performing the first join operation includes the step of performing an equijoin operation.

27. The method of claim 25, wherein the variable-length codes contains as least as many digits the fixed-length codes.

28. A computer-readable medium performing a spatial join according to a spatial predicate of a set of first objects and a set of second objects, said instructions arranged, when executed by one or more processors, to cause the one or more processors to perform the steps of:

performing a first join operation between the set of first objects and the set of second objects based on fixed-length codes identifying cells in which at least part of the first objects and second objects exist;

performing a second join operation on results of the first join operation based on the variable length codes identifying cells in which at least part of the first objects and second objects exist; and performing a spatial join operation on results of the second join operation based on the spatial predicate.

29. The computer-readable medium of claim 28, wherein the step of performing the first join operation includes the step of performing an equijoin operation.

30. The computer-readable medium of claim 28, wherein the variable-length codes contains as least as many digits the fixed-length codes.

* * * * *